US012620882B2

(12) United States Patent
Nguyen et al.

(10) Patent No.: US 12,620,882 B2
(45) Date of Patent: May 5, 2026

(54) EDDY CURRENT MAGNETIC BRAKING DEVICE, BRAKED VEHICLE WHEEL AND AIRCRAFT LANDING GEAR EQUIPPED WITH SUCH A WHEEL

(71) Applicant: SAFRAN LANDING SYSTEMS, Velizy Villacoublay (FR)

(72) Inventors: Duy-Minh Nguyen, Moissy-Cramayel (FR); Guillaume Durand, Moissy-Cramayel (FR); Graeme Klim, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 224 days.

(21) Appl. No.: 18/289,347

(22) PCT Filed: May 3, 2022

(86) PCT No.: PCT/EP2022/061840
§ 371 (c)(1),
(2) Date: Nov. 2, 2023

(87) PCT Pub. No.: WO2022/233863
PCT Pub. Date: Nov. 10, 2022

(65) Prior Publication Data
US 2024/0372452 A1      Nov. 7, 2024

(30) Foreign Application Priority Data
May 3, 2021      (FR) ...................................... 2104657

(51) Int. Cl.
*H02K 49/04*      (2006.01)
*B60B 27/00*      (2006.01)
(Continued)

(52) U.S. Cl.
CPC ....... *H02K 49/046* (2013.01); *B60B 27/0047* (2013.01); *B60T 8/1703* (2013.01);
(Continued)

(58) Field of Classification Search
CPC ........ H02K 11/215; H02K 1/16; H02K 29/08; H02K 2211/03; H02K 3/522
(Continued)

(56) References Cited

U.S. PATENT DOCUMENTS

2007/0000741 A1      1/2007  Pribonic et al.
2018/0138795 A1*     5/2018  Imanishi ............. H02K 49/043
2020/0300310 A1      9/2020  Kostic

FOREIGN PATENT DOCUMENTS

CN      105591523 A      5/2016
CN      106081148 A      11/2016
(Continued)

OTHER PUBLICATIONS

"Eddy current", Wikipedia, Mar. 8, 2018, Retrieved from the Internet: file:///C:/Users/dw53325/AppData/Local/Temp/Eddy_current.pdf, [retrieved on Apr. 12, 2018], XP055466757.
(Continued)

*Primary Examiner* — Christopher M Koehler
*Assistant Examiner* — Viswanathan Subramanian
(74) *Attorney, Agent, or Firm* — Sughrue Mion, PLLC

(57)                ABSTRACT
A braking device includes one or more stationary elements and one movable element that is movable with respect to the one or more stationary elements, the moveable element being made of an electrically conductive material, one or the one or more stationary elements including magnets capable of generating eddy currents in the movable element, when the one or more stationary elements and the movable element are in relative movement. The magnets include first magnets and second magnets disposed alternating, the first
(Continued)

magnets having a first magnetization vector and each of the second magnets having a second magnetization vector, and the magnets have widths such that the first magnets are spaced apart in pairs by a first distance that is less than a second distance separating the second magnets in pairs, and the length of the second magnets being around 70% of the length of the first magnets.

9 Claims, 4 Drawing Sheets

(51) Int. Cl.
    *B60T 8/17*           (2006.01)
    *B64C 25/44*        (2006.01)

(52) U.S. Cl.
    CPC ......... *B64C 25/44* (2013.01); *B60B 2900/111* (2013.01); *B60B 2900/114* (2013.01)

(58) Field of Classification Search
    USPC ...................................................... 310/93, 105
    See application file for complete search history.

(56)            References Cited

FOREIGN PATENT DOCUMENTS

| CN | 111900855 | A | 11/2020 |
|----|-----------|---|---------|
| EP | 3 309 944 | A1 | 4/2018 |
| FR | 2 953 196 | A1 | 6/2011 |
| WO | 2014/029962 | A1 | 2/2014 |

OTHER PUBLICATIONS

International Search Report for PCT/EP2022/061840 dated Jul. 1, 2022.
Written Opinion for PCT/EP2022/061840 dated Jul. 1, 2022.

* cited by examiner

EDDY CURRENT MAGNETIC BRAKING DEVICE, BRAKED VEHICLE WHEEL AND AIRCRAFT LANDING GEAR EQUIPPED WITH SUCH A WHEEL

This Application is a National Stage of International Application No. PCT/EP2022/061840 filed May 3, 2022, claiming priority based on French Patent Application No. 2104657 filed May 3, 2021 the contents of each of which being herein incorporated by reference in their entireties.

The present invention relates to the field of the braking of vehicle wheels, such as aircraft wheels.

BACKGROUND OF THE INVENTION

An aircraft wheel generally comprises a rim connected by a wall to a hub mounted to rotate on a wheel support shaft (axle or spindle).

Friction braking devices are known, comprising a brake disc stack which is housed in a space extending between the rim and the hub and which comprises alternating rotor discs rotatably linked with the wheel and stator discs, stationary with respect to the wheel support. The braking device also comprises hydraulic or electromechanical actuators mounted on an actuator carrier and arranged to apply a controlled braking force on the stack of discs, so as to block the rotation of the wheel.

It has been proposed, in particular in document FR-A2953196, to equip such braked wheels with an electromagnetic auxiliary brake ensuring an energy dissipation by means other than mechanical friction.

Eddy current magnetic braking devices are further known, used for the braking of vehicle wheels, and more specifically, aircraft wheels. Document WO-A-2014/029962 describes such a device comprising a rotor which is provided with one or more magnets, and which is mounted opposite an electromagnetic stator.

Document US-A-20200300310 itself also describes an eddy current magnetic braking device.

Generally, the performance of an eddy current magnetic braking device depends on the power of the magnets used and on their dimensions. The braking device is therefore relatively heavy and bulky when the maximum braking power required is significant. Such is the case, for example, of a use on an aeroplane, even though the mass and the bulk are severe constraints for this use.

[1] Translation of the title as established ex officio.

AIM OF THE INVENTION

The invention aims, in particular, to propose an eddy current magnetic braking device, at least partially overcoming the abovementioned disadvantages.

SUMMARY OF THE INVENTION

To this end, an eddy current magnetic braking device according to the invention is provided, comprising at least one stationary element and one movable element with respect to the stationary element in a direction of movement by having a surface opposite a surface of the stationary element, one of the elements comprising a plurality of magnets capable of generating in the other of the elements, made of electrically conductive material, eddy currents, when the two elements are in relative movement. The plurality of magnets comprises first magnets that have a first magnetisation vector substantially perpendicular to the opposite surfaces and being separated in pairs by a second magnet that has a second magnetisation vector substantially perpendicular to the first magnetisation vectors of the two first magnets, between which the second magnet is located. The magnets have widths such that the first magnets are spaced apart in pairs by a first distance less than a second distance separating the second magnets in pairs.

This arrangement of the magnets makes it possible to optimise and to concentrate the magnetic flow produced by the first magnets by reducing the return path of the magnetic flow which passes through the second magnets. The narrowest width of the second magnets surprisingly enables an increase of the eddy currents generated, and therefore an increase of the braking torque provided. This further has the advantage of limiting the mass and the bulk of the device.

The invention also relates to a braked wheel equipped with such a device and a landing gear equipped with such a wheel.

Other features and advantages of the invention will emerge upon reading the following description of particular and non-limiting embodiments of the invention.

BRIEF DESCRIPTION OF THE DRAWINGS

Reference will be made to the accompanying drawings, among which.

DETAILED DESCRIPTION OF THE INVENTION

Figure 1:
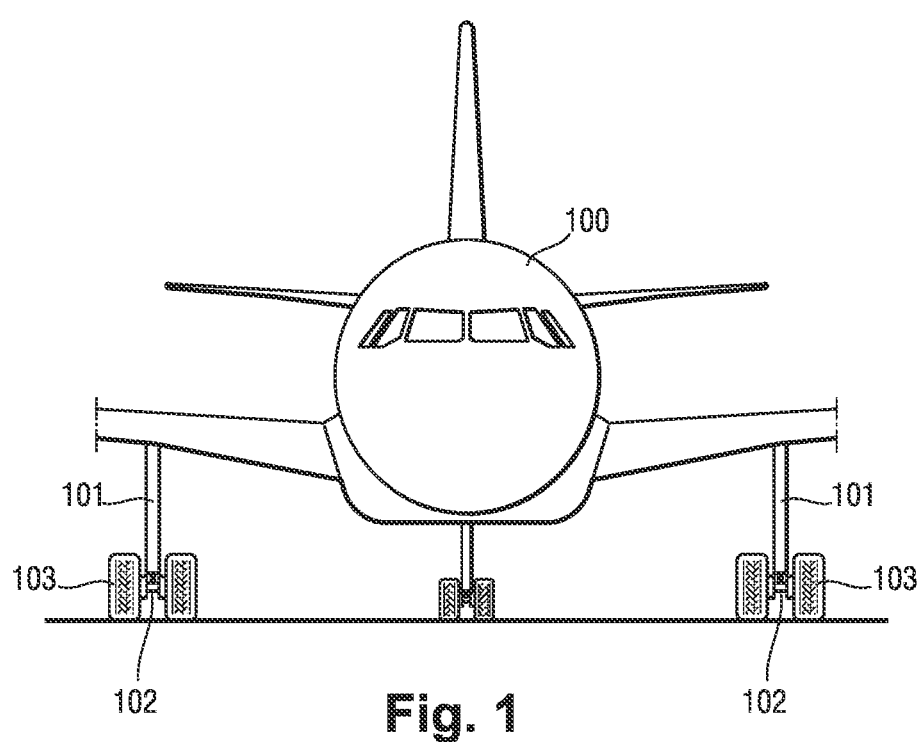
FIG. 1 is a partial schematic view of an aircraft equipped with a landing gear according to the invention.
Figure 2:
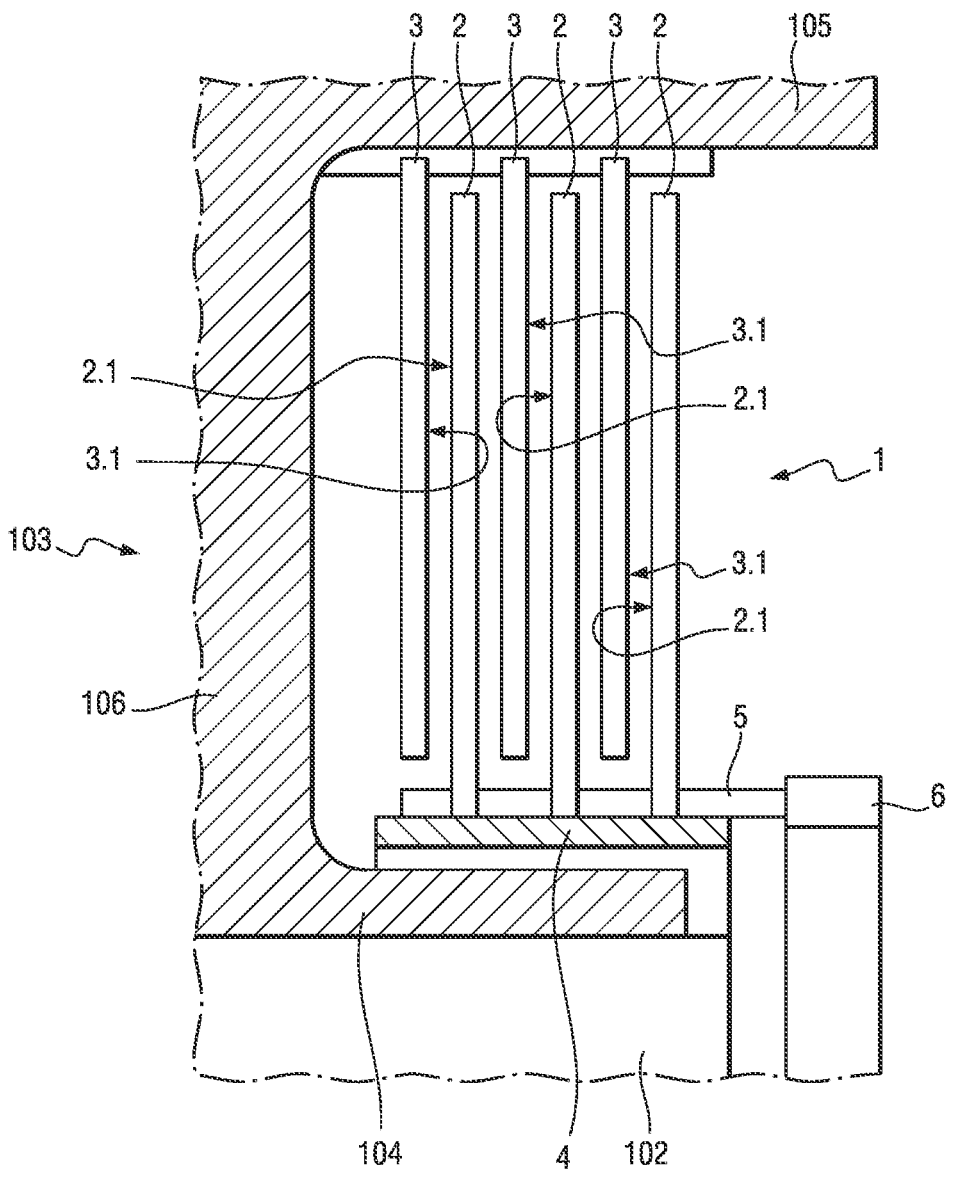
FIG. 2 is a partial schematic view, as an axial cross-section, of a wheel equipped with a braking device according to a first embodiment of the invention.
Figure 3:
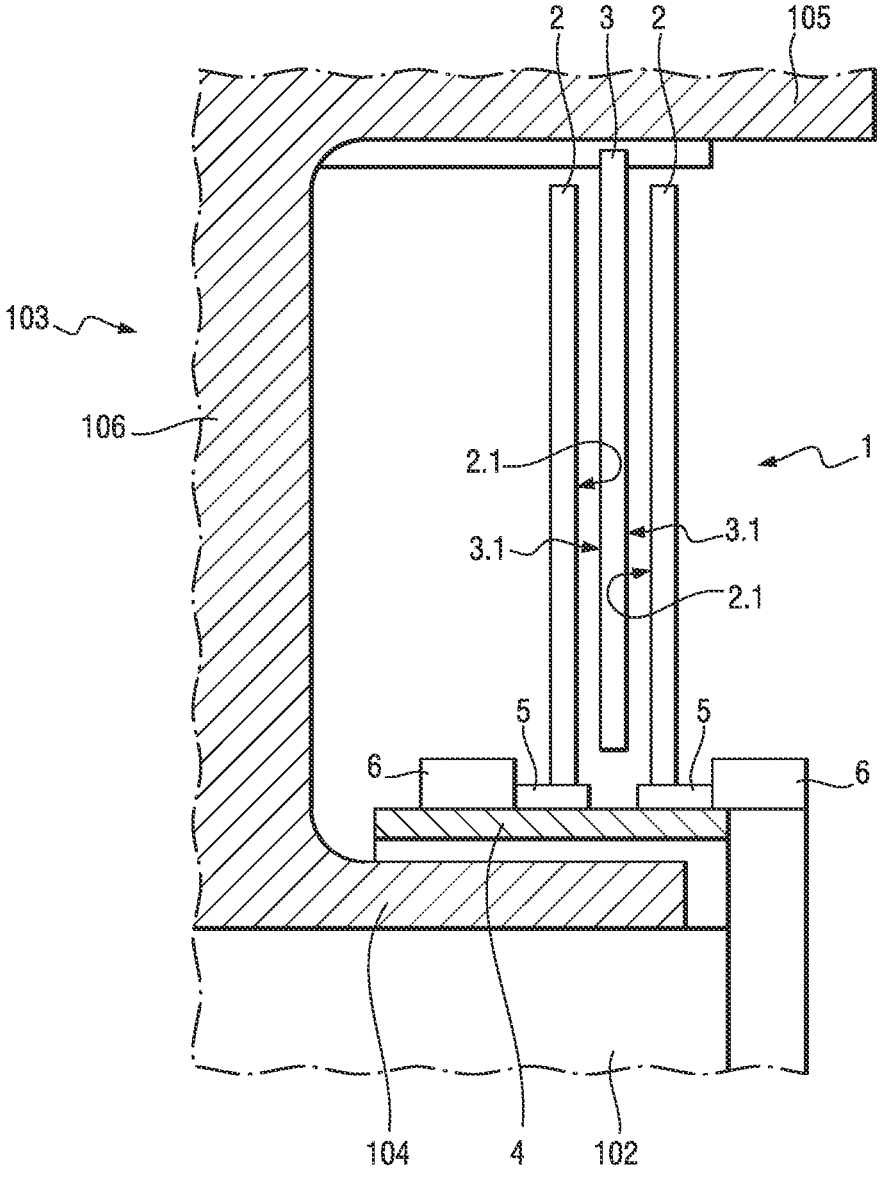
FIG. 3 is a partial schematic view, as an axial cross-section, of a wheel equipped with a braking device according to a second embodiment of the invention.

In reference to FIGS. 1 to 3, the braking system according to the invention is carried by an aircraft 100 comprising landing gears 101. Each landing gear 101 comprises a strut having an end provided with two coaxial shafts 102 on each of which a wheel 103 is mounted to pivot. Each wheel 103 comprises, in a manner known per se, a hub 104 mounted to pivot on the shaft 102 and a rim 105 connected to the hub 104 by a wall 106.

According to the invention, the wheels 103 are equipped with a magnetic braking device, generally referenced as 1.

The magnetic braking device 1 comprises stationary elements, or stators 2, and movable elements, or rotors 3.

More specifically in this case, the stators 2 and the rotors 3 are disc-shaped, coaxial to the wheel 103, therefore having colinear central axes. The stators 2 are rotatably linked to the shaft 103 or to the strut 102, in this case by way of a twisting tube 4, while the rotors 3 are rotatably linked to the wheel 104, for example to the rim of the wheel 104. Thus, in each pair, each rotor 3 rotates on itself about its central axis with respect to the stator 2: during this movement of the rotor 3 in a circumferential direction, the main face 3.1 remains opposite the main face 2.1 and parallel to it.

According to the first embodiment of the braking device represented in FIG. 2, the stators 2 and the rotors 3 are arranged in pairs: each stator 2 has a main face 2.1 extending opposite a main face 3.1 of one of the rotors 3. The faces 2.1, 3.1 are parallel to one another.

The stators 2 are mounted on a slider 5 sliding on the twisting tube 4 to be movable in an axial direction of the twisting tube 4 between a first position, wherein the rotor 3 and the stator 2 of each pair are moved closer to one another and have their main faces 3.1, 2.1 separated by a predetermined first air gap and a second position, wherein the rotor 3 and the stator 2 of each pair are spaced apart from one another and have their main faces 3.1, 2.1 separated by a predetermined second air gap greater than the predetermined first air gap. At least one electromechanical actuator 6 controllable by the pilot of the aeroplane in a manner known per se moves the slider 6 between the two abovementioned positions. An axial abutment is provided, of the bearing abutment or needle abutment type, interposed between the rotors 3 and the stators 2 to ensure that the stators 2 cannot be moved closer to the rotors 3 beyond the first air gap.

According to the second embodiment of the braking device represented in FIG. 3, the stators 2 and the rotors 3 are arranged in threes, only one of which is represented in this case: each rotor 3 is disposed between two stators 2, each having a main face 2.1 extending opposite a main face 3.1 of the rotor 3. The faces 2.1, 3.1 are parallel to one another.

The stators 2 are rotatably linked to the shaft 102 or to the strut of the landing gear 101, in this case by way of a twisting tube 4, while the rotors 3 are rotatably linked to the wheel 103, in this case to the rim 105 of the wheel 103. Thus, in each three, each rotor 3 rotates on itself about its central axis with respect to the stators 2 which surround it: during this movement of the rotor 3 in a circumferential direction, the main faces 3.1 remain opposite the main faces 2.1 and parallel to these.

Each of the stators 2 is mounted on a slider 5 sliding (without rotation) over the twisting tube 4 to be movable in an axial direction of the twisting tube 4 between a first position, wherein the rotor 3 and the stator 2 are moved closer to one another and have their main faces 3.1, 2.1 separated by a predetermined first air gap and a second position, wherein the rotor 3 and the stator 2 are spaced apart from one another and have their main faces 3.1, 2.1 separated by a predetermined second air gap greater than the predetermined first air gap. At least one electromechanical actuator 6, controllable by the pilot of the aeroplane in a manner known per se, moves the slider 5 between the two abovementioned positions. An axial abutment is provided, of the bearing abutment or needle abutment type, interposed between the rotors 3 and the stators 2 (or between the parts linked to these) to ensure that the stators 2 cannot be moved closer to the rotors 3 beyond the first air gap.

In these two embodiments, the rotors 3 and stators 2 are constituted in the same way.

The rotors 3 are made of copper or of any other electrically conductive material.

Figure 4:
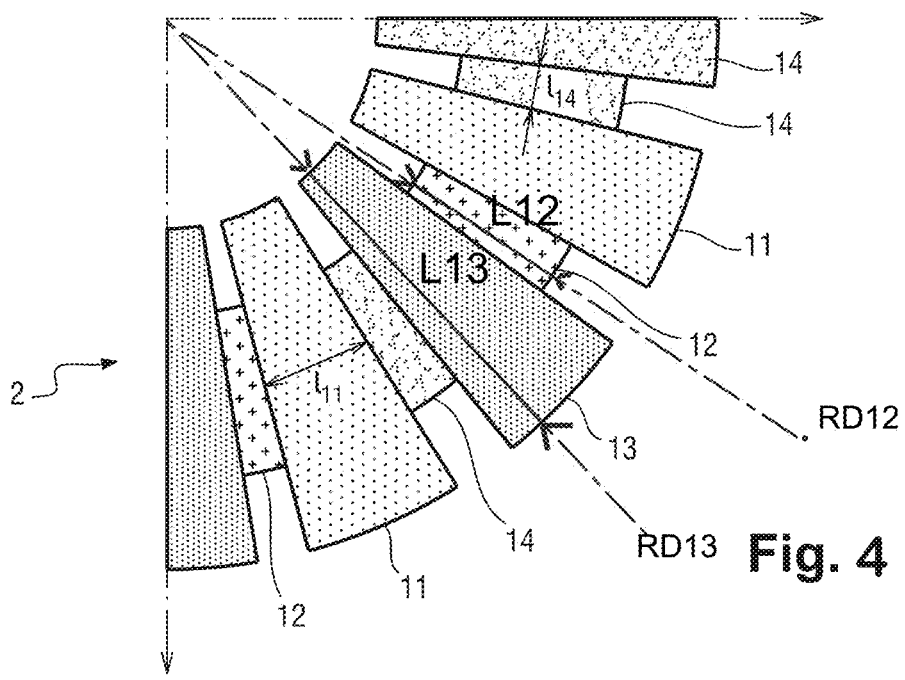
FIG. 4 is a partial schematic view of an arrangement of magnets according to a particular embodiment of the invention.

In reference to FIGS. 4 and 5 also, each stator 2 comprises a plurality of magnets capable of generating eddy currents in the rotor 3 when the stator 2 is in the first position and that the rotor 3 pivots facing the stator 2. There are, for example 16 magnets, in this case, rare earth-based, and are preferably fixed to a magnetic steel support, even to a non-magnetic support. The thickness of the support preferably being relatively low, while satisfying the thermal and mechanical stresses.

The plurality of magnets comprises first magnets 11, 13 that have a first magnetisation vector substantially perpendicular to the main face 2.1 and being separated in pairs by a second magnet 12, 14 that has a second magnetisation vector substantially perpendicular to the first magnetisation vectors of the two first magnets 11, 13 between which the second magnet 12, 14 is located. More specifically, the magnets 11, 12, 13, 14 have angular sector shapes, and have a length (the length L13 of the first magnet 13 and the length L12 of the second magnet 12 are visible on FIG. 4) measured in a radial direction (the radial direction RD13 of the first magnet 13 and the radial direction RD12 of the second magnet 12 are visible on FIG. 4) of the stator 2 and an average width 1 (the width $1_{11}$ of the first magnet 11 and the width $1_{14}$ of the second magnet 14 are visible on FIG. 4) measured in a locally tangential direction of the discs (i.e. perpendicularly to the direction of the length L), at half said length L. The lengths L and widths 1 are measured in directions locally parallel to the opposite surfaces (the main faces 2.1, 3.1).

The magnets 11, 12, 13, 14 are disposed according to a Halbach pattern, alternating in the circumferential direction of the stator 2 as follows: a magnet 11, a magnet 12, a magnet 13, a magnet 14, a magnet 11, a magnet 12, a magnet 13, a magnet 14, a magnet 11 and so on . . . It is reminded that the magnetisation vector indicates the direction of the magnetic field generated by a magnet and extends into the magnet from the South pole to the North pole. In this case:

each magnet 11 has its magnetisation vector which exits from the main face 2.1 (its North pole opens onto the main face 2.1), each magnet 12 has its magnetisation vector which extends from the neighbouring magnet 11 to the neighbouring magnet 13, each magnet 13 has its magnetisation vector which returns into the main face 2.1 (its South pole opens onto the main face 2.1), each magnet 14 has its magnetisation vector which extends from the neighbouring magnet 11 to the neighbouring magnet 13.

It is understood that the magnets 12, 14 disposed on each side of one same magnet 11 have their magnetisation vector in opposite directions.

The magnets 11, 12, 13, 14 have widths 11, 112, 113, $1_{14}$ such that the first magnets 11, 13 are spaced apart in pairs by a first distance less than a second distance separating the second magnets 12, 14 in pairs. The best results are obtained, when the width $1_{12}$, $1_{14}$ of the second magnets 12, 14 is around 70% those $1_1$, $1_{13}$ of the first magnets 11, 13.

In reference to FIG. 4, the lengths $L_{11}$, $L_{13}$ of the magnets 11, 13 are identical to one another, and the lengths $L_{12}$, $L_{14}$ of the magnets 12, 14 are identical to one another. The lengths $L_{11}$, $L_{13}$ of the magnets 11, 13 are greater than the lengths $L_{12}$, $L_{14}$ of the magnets 12, 14. Preferably, the length $L_{12}$, $L_{14}$ of the second magnets 12, 14 are 70% that of the first magnets 11, 13.

In the arrangement represented in FIG. 4, the magnets 12, 14 are positioned symmetrically over a circle passing through the geometric centre of the North poles of the magnets 11 and South poles of the magnets 13.

It is understood that the magnets 12, 14 occupy, on the main face 3.1, a surface smaller than that of the magnets 11, 13.

The arrangement of the magnets 11, 12, 13, 14 makes it possible to optimise and to concentrate the magnetic flow produced by the magnets 11, 13 by reducing the return path of the magnetic flow which passes through the magnets 12, 14, and not through the support, the mass of which can be reduced, since there is no need to ensure a conduction function of the magnetic flow.

With respect to the prior art, the invention enables an increase of the braking torque provided, while limiting the mass and the bulk of the device.

Furthermore, the manufacturing of the second magnets is facilitated.

It is understood that to cause the braking, the electromechanical control actuators are controlled to bring the stators 2 into the first position, and that, to interrupt the braking, the electromechanical control actuators are controlled to bring the stators 2 into the second position, position in which the magnets do not make it possible to generate sufficient eddy currents in the rotors to cause the braking of the rotors. It will be noted that below a certain rotation speed of the rotors 3, the braking torque is insignificant, whatever the position of the stators. An additional brake must thus possibly be considered.

Naturally, the invention is not limited to the embodiments described, but includes any variant entering into the field of the invention such as defined by the claims.

In particular, the device can have a structure different from that described.

The magnets can be carried by the rotor instead of the stator.

The shape and the dimensions of the magnets can be different from those described. Preferably, the first magnets 11, 13 will represent around 70% of the surface of the element which carries them, but this is not compulsory.

The number of rotors and/or the number of stators can be different from those mentioned.

The device described has an axial flow, but the invention is applicable to a radial flow operation. Thus, although the rotor and the stator have been described in the form of parallel discs and opposite one another, the stator and the rotor can have other forms. They can, for example, be arranged in the form of an external drum and of an internal drum engaged in the external drum, such that the internal drum has an outer surface opposite an inner surface of the external drum. The magnets are carried by the external surface of the internal drum or by the internal surface of the external drum.

The magnetic braking device according to the invention can be associated with a conventional friction braking device, which comprises friction members, for example a stack of carbon discs, and a plurality of electromechanical actuators carried by an actuator carrier. Each electromechanical actuator comprises an electric motor and a push-button capable of being moved by the electric motor to press the stack of discs. The electromechanical actuator is thus intended to produce a controlled braking force on the stack of discs. A mode for controlling the braking devices is, for example, known from document FR-A-2953196.

In a variant, the magnets can be directly fixed to the rotor discs or the stator discs of the friction brake to slow down the wheel through a magnetic braking, when the discs are spaced apart from one another by an adequate air gap.

It is possible to use, for the mechanical actuation of the magnetic braking device, a distinct actuator for each stator rather than an actuator acting on a slider carrying several stators.

Other actuation modes of the magnetic brake can be considered: mechanical, for example, by axially moving the rotors and no longer the stators, or electromagnetic, by means of coils generating a magnetic field cancelling that of the permanent magnets.

The invention can be used on any type of vehicle.

The length of the second magnets (12, 14) is around 70% that of the first magnets (11, 13), i.e. 70% within a few tenths of a percent or within a few percent.

The invention claimed is:

1. An eddy current magnetic braking device comprising:
   at least one stationary element and one movable element that is movable with respect to the at least one stationary element in a movement direction, by having a surface opposite a surface of the at least one stationary element, the one moveable element being made of an electrically conductive material, one of the at least one stationary element comprising a plurality of magnets capable of generating eddy currents in the one movable element, when the at least one stationary element and the one movable element are in relative movement,
   wherein the plurality of magnets comprises first magnets and second magnets disposed alternating, the first magnets having a first magnetization vector substantially perpendicular to the opposite surfaces and each of the second magnets having a second magnetization vector substantially perpendicular to the first magnetization vectors of two first magnets, between which the second magnet is located, and
   wherein the plurality of magnets have widths, measured from end-to-end respectively, such that the first magnets are spaced apart in pairs by a first distance that is less than a second distance separating the second magnets in pairs, and
   wherein the first magnets have a length measured from end-to-end in a direction perpendicular to their width and locally parallel to the opposite surfaces which is greater than a length of the second magnets measured from end-to-end in a direction perpendicular to their width and locally parallel to the opposite surfaces, the length of the second magnets being around 70% of the length of the first magnets.

2. The eddy current magnetic braking device according to claim 1, wherein the width of the second magnets is around 70% of the width of the first magnets.

3. The eddy current magnetic braking device according to claim 1, wherein the first magnets represent around 70% of the surface of the at least one stationary element.

4. The eddy current magnetic braking device according to claim 1, wherein the at least one stationary element and the one movable element have a disc shape and have colinear central axes, the one movable element having a main face opposite a main face of the at least one stationary element, thus forming the opposite surfaces and the one movable element pivoting on its central axis, each first magnetization vector extending perpendicularly to the main faces, and each second magnetization vector extending parallel to the main faces and to a direction locally tangent to the at least one stationary element provided with the plurality of magnets, the width of each of the plurality of magnets being measured in a direction locally tangential to the at least one stationary element.

5. The eddy current magnetic braking device according to claim 4, wherein the plurality of magnets have an angular sector shape and the first magnets have a radial dimension from end-to-end greater than a radial dimension of the second magnets from end-to-end.

6. The eddy current magnetic braking device according to claim 1, wherein the magnets (11, 12, 13, 14) are disposed according to a Halbach pattern.

7. The eddy current magnetic braking device according to claim 1, wherein the plurality of magnets are included in the at least one stationary element.

8. A braked vehicle wheel comprising the the eddy current magnetic braking device according to claim 1, wherein the braked vehicle wheel comprises a rim, a wall or a hub to which the one movable element is rotatably linked.

9. A landing gear comprising a strut having a shaft at an end thereof, and the braked vehicle wheel according to claim 8, wherein the braked vehicle wheel comprises the hub and the hub is mounted on the shaft, and wherein the at least one stationary element of the braked vehicle device is rotatably linked to the strut.

\* \* \* \* \*